United States Patent [19]

Yamamoto et al.

[11] Patent Number: 4,541,302
[45] Date of Patent: Sep. 17, 1985

[54] SUPPORT STRUCTURE FOR POWER TRANSMISSION CABLES

[75] Inventors: Keniti Yamamoto; Tenji Suzuki, both of Toyota; Yukitomo Sanada, Okazaki, all of Japan

[73] Assignee: Toyota Jidosha Kogyo Kabushiki Kaisha, Toyota, Japan

[21] Appl. No.: 623,640

[22] Filed: Jun. 26, 1984

Related U.S. Application Data

[63] Continuation of Ser. No. 358,585, Mar. 16, 1982, abandoned.

[30] Foreign Application Priority Data

Aug. 5, 1981 [JP] Japan ............................ 56-116535[U]

[51] Int. Cl.⁴ .............................................. F16C 1/10
[52] U.S. Cl. .................................................. 74/501 R
[58] Field of Search ..................... 74/501 R; 248/56; 181/200, 204, 207, 208

[56] References Cited

U.S. PATENT DOCUMENTS

| | | |
|---|---|---|
| 1,630,076 | 5/1927 | Schmidt . |
| 1,762,172 | 6/1930 | Gyllin . |
| 1,800,578 | 4/1931 | Webb ............................ 248/56 X |
| 1,897,216 | 2/1933 | Schmidt . |
| 2,382,970 | 8/1945 | Borcherdt ........................... 248/56 |
| 2,926,762 | 3/1960 | Edgley .................................. 192/4 |
| 3,288,407 | 11/1966 | Downer et al. ..................... 248/56 |
| 3,600,966 | 4/1971 | Anderson ...................... 74/473 SW |
| 4,143,560 | 3/1979 | Kinkade et al. ................. 74/473 R |
| 4,237,998 | 12/1980 | Matayoshi ..................... 181/200 X |

FOREIGN PATENT DOCUMENTS

| | | | |
|---|---|---|---|
| 1120707 | 7/1956 | France ................................ 248/56 |
| 1285314 | 1/1962 | France ................................ 248/56 |

Primary Examiner—James A. Leppink
Assistant Examiner—Frank H. McKenzie, Jr.
Attorney, Agent, or Firm—Oblon, Fisher, Spivak, McClelland & Maier

[57] ABSTRACT

In a vehicle body structure wherein a reinforcement panel is fixedly arranged at an angle to reinforce an upright fire-wall panel in the form of a rear wall of an engine room for mounting a power transmission unit together with an internal combustion engine in the engine room and wherein each of the panels is provided with a through hole through which at least a push-pull cable of the power transmission unit extends into the vehicle compartment to be connected to a manual shift lever, a support structure for the push-pull cable comprises a pair of cover members of elastic material fixedly coupled over the through hole of each of the panels for resiliently supporting and clamping the push-pull cable thereon and for closing the interior space between the panels.

3 Claims, 7 Drawing Figures

SUPPORT STRUCTURE FOR POWER TRANSMISSION CABLES

This application is a continuation of application Ser. No. 358,585, filed Mar. 16, 1982, now abandoned.

BACKGROUND OF THE INVENTION

The present invention relates to a support structure for push-pull cables of a power transmission unit which is mounted together with an internal combustion engine within an engine room of an automotive vehicle.

In the case that an internal combustion engine is transversely mounted and connected to a power transmission unit within an engine room, it is required to enhance the support strength of an upright fire-wall panel in the form of a rear wall of the engine room. For this requirement, a reinforcement panel is arranged at an angle within the vehicle compartment and is fixed at its one end to the upper portion of the fire-wall panel and at its other end to a floor panel of the compartment to reinforce the fire-wall panel. Additionally, push-pull cables for a shift mechanism of the transmission unit are arranged in general to extend into the vehicle compartment across both the panels. In such an arrangement of the cables, engine noises are propagated through the cables into the interior space between the panels and resonate therein, resulting in unpleasant noises in the vehicle compartment. Furthermore, there occur unpleasant noises due to vibratory contact of the cables against the panels.

SUMMARY OF THE INVENTION

It is, therefore, a primary object of the present invention to provide a support structure for the power transmission cables which is capable of resiliently supporting and clamping the cables on the spaced panels and capable of preventing the vehicle compartment from unpleasant noises propagated through the cables from the engine room in a simple construction.

In a presently preferred embodiment of the present invention, the primary object is accomplished by provision of a support structure for push-pull cables of a power transmission unit which comprises a pair of cover members of elastic material fixedly coupled over each opening of an upright fire-wall panel and a reinforcement panel spaced to each other for resiliently clamping and supporting the push-pull cables thereon and for closing the interior space between the panels.

BRIEF DESCRIPTION OF THE DRAWINGS

Additional objects and advantages of the present invention will be more readily apparent from the following detailed description of preferred embodiments thereof when taken together with the accompanying drawings, in which.

DESCRIPTION OF THE PREFERRED EMBODIMENTS

Figure 1:
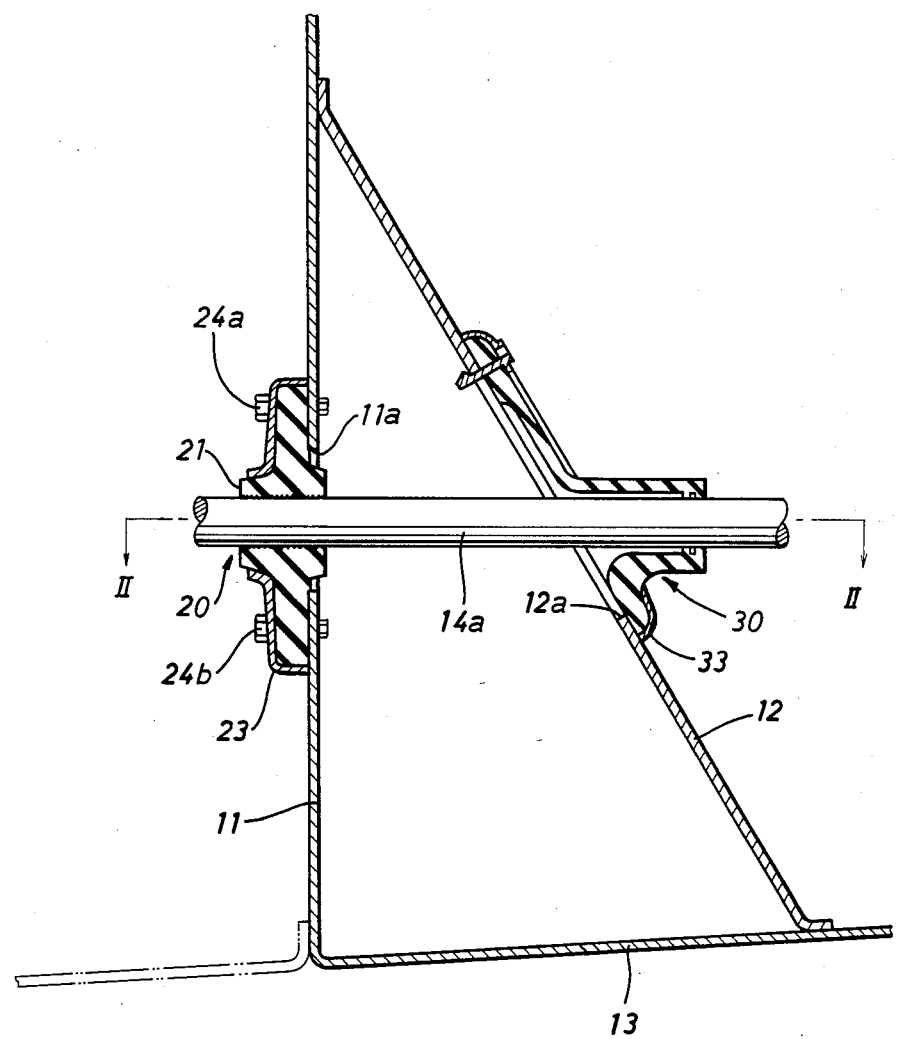
FIG. 1 shows a view of a fragmentarily elevational cross-section of a support structure for push-pull cables in accordance with the present invention.
Figure 2:
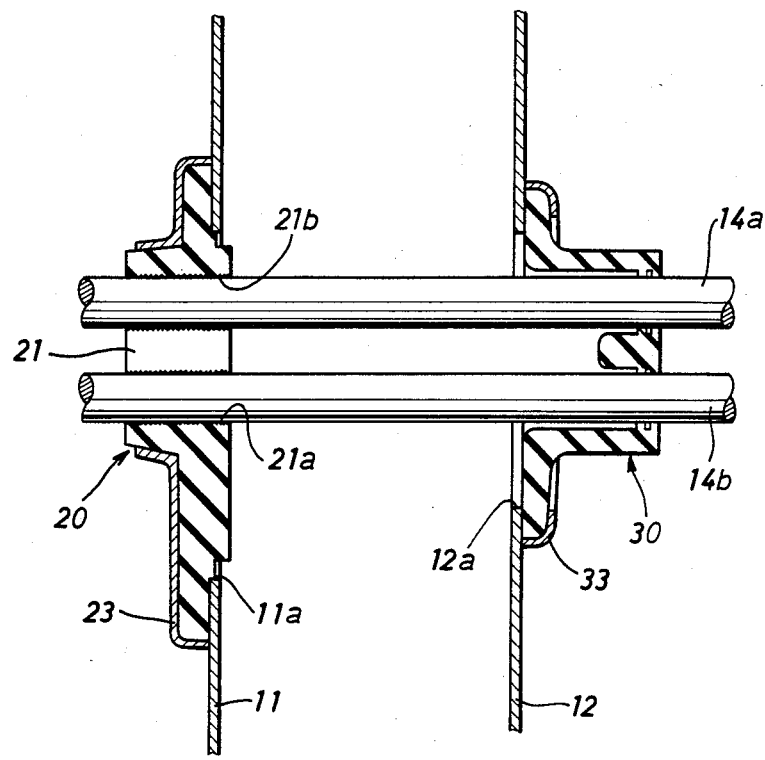
FIG. 2 is a sectional view of the support structure taken along line II—II in FIG. 1.

Referring now to the drawings, FIG. 1 illustrates an upright fire-wall panel 11 in the form of a rear wall of an engine room of a vehicle, and a reinforcement panel 12 in the form of a toe-board arranged at a slant angle in the vehicle compartment. The reinforcement panel 12 is welded at its upper end to the upper portion of fire-wall panel 11 and its lower end to a floor panel 13 of the compartment to enhance the supporting strength of fire-wall panel 12. With the reinforced construction, an internal combustion engine is mounted together with a power transmission unit on a vehicle body structure in the engine room, and a pair of push-pull cables 14a, 14b extend into the vehicle compartment from the transmission unit across both the wall panels 11 and 12. The push-pull cables 14a, 14b are arranged to be connected at their one ends to a shift mechanism of the transmission unit and at their other ends to a manual shift lever which is mounted in the compartment.

Figure 3:
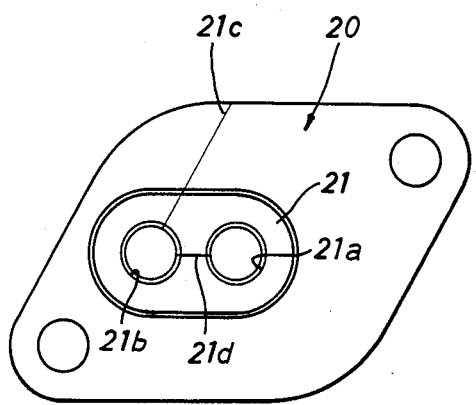
FIG. 3 is a front view of a cover member attached to an upright fire-wall panel shown in FIG. 1.

In the assembling construction described above, cover members 20 and 30 of elastic material such as synthetic rubber are fixedly coupled over an axial hole 11a of fire-wall wall 11 and an axial hole 12a of panel 12 respectively in such a manner that the push-pull cables are supported at their intermediate portions by both the cover members 20 and 30. The cover member 20 is anchored in place to the front face of fire-wall 11 by means of a bracket 23 which is fixed at its both corners by a pair of bolts 24a, 24b threaded into the fire-wall 11, while the cover member 30 is anchored in place to the rear face of reinforcement panel 12 by means of a bracket 33 which is hooked to the panel 12 in such a manner as described in detail later. As can be well seen in FIG. 3, the cover member 20 is integrally formed at its approximately central portion with a grommet 21 which is provided therein with a pair of parallel through holes 21a, 21b for supporting the push-pull cables 14a, 14b. Each of through holes 21a, 21b has an inner diameter slightly smaller than the outer diameter of respective cables 14a, 14b and is formed at its inner circumferential wall with female screw threads like grooves. In the grommet 21 of cover member 20, a lateral slit 21d is provided between both the holes 21a and 21b, and a radial slit 21c extends into the hole 21b. The bracket 23 is also designed to contain the cover member 20 therein except for its grommet portion 21.

In the mounting process of cover member 20, both the push-pull cables 14a, 14b are previously inserted into the vehicle compartment across the axial through holes 11a, 12a of the respective wall panels 11, 12 and then inserted into the through hole 21b of grommet 21 across the radial slit 21c of cover member 20 in sequence. The previously inserted cable 14a is further inserted into the through hole 21a of grommet 21 across the lateral slit 21d. Thus, both the push-pull cables 14a, 14b are retained by the cover member 20 and further inserted into the bracket 23 across its radial slot (not shown). Thereafter, the bracket 23 is coupled over the cover member 20 and fixed to the fire-wall 11 by bolts 24a, 24b. As a result, the cover member 20 serves to close the through hole 11a 11a of fire-wall 11 and to resilient clamp both the push-pull cables 14a, 14b with an appropriate interference.

Figure 4:
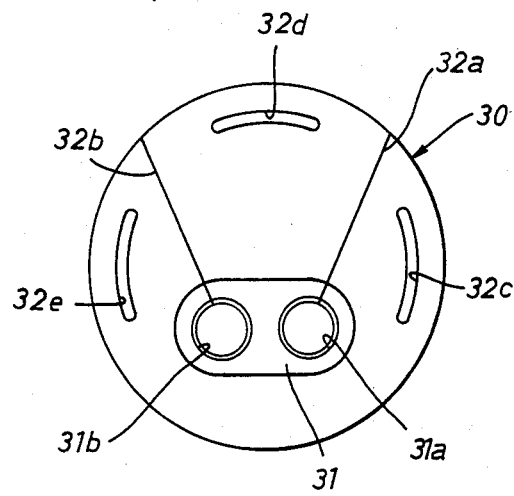
FIG. 4 is a rear view of a cover member attached to a reinforcement panel shown in FIG. 1.
Figure 5:
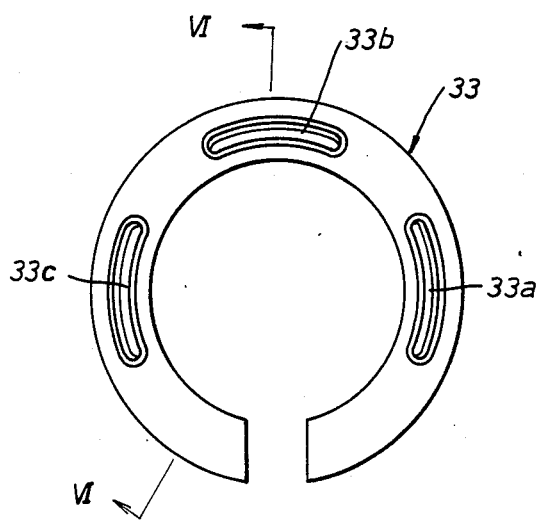
FIG. 5 is a rear view of a bracket coupled over the cover member of FIG. 4.
Figure 6:
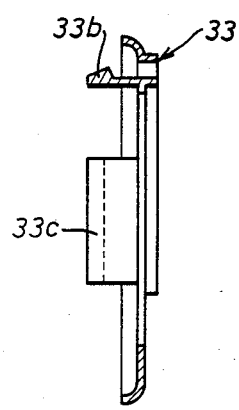
FIG. 6 is a sectional view of the bracket taken along line VI—VI in FIG. 5.

As can be seen in FIG. 4, the cover member 30 is integrally formed at its approximately central portion with a grommet 31 which is provided therein with a pair of parallel through holes 31a, 31b for supporting therein the push-pull cables 14a, 14b. Each of the through holes 31a, 31b has an inner diameter slightly smaller than the outer diameter of the respective cables 14a, 14b and is formed at its inner circumferential wall with female threads like grooves. The cover member is provided with a pair of radial slits 32a, 32b which extend into each of through holes 31a, 31b, and it is further provided at its peripheral portion with semi-circular slots 32c, 32d and 32e. As can be well seen in FIGS. 5 and 6, the bracket 33 is designed to contain therein the peripheral portion of cover member 30 and is integrally formed with semi-circular hooks 33a, 33b, 33c which are arranged to be inserted into the corresponding slots 33c, 33d, 33e and engaged with the peripheral portion of through hole 12a of the reinforcement panel 12.

In the mounting process of cover member 30, the push-pull, cables 14a, 14b are inserted into the through holes 31a, 31b of grommet 31 across the respective radial slits 32a and 32b, and the respective hooks 33a, 33b, and 33c of bracket 33 are inserted into the corresponding slots 32c, 32d, 32e of cover member 30 to couple over the cover member 30. Thereafter, the bracket 33 is fixed to the reinforcement panel 12 by engagement of its hooks with the peripheral portion of through hole 12a of the panel 12. Thus, the cover member 30 is anchored in place and serves to close the through hole 12a of panel 12 and to resiliently support both the push-pull cables 14a, 14b with an appropriate interference but without clamping.

Figure 7:
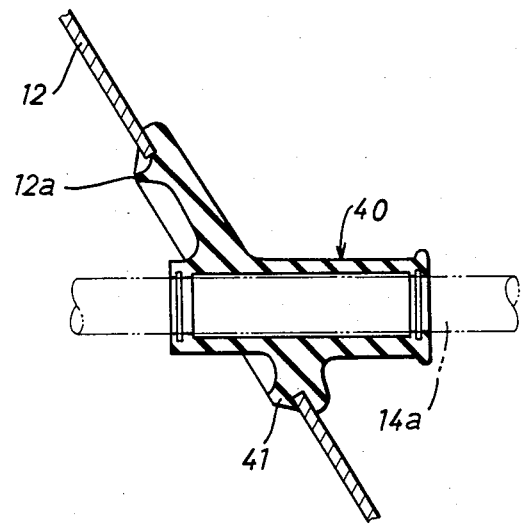
FIG. 7 shows a fragmentarily elevational cross-section of a modification of the cover member of FIG. 4.

Although in the embodiment the cover member 30 is anchored in place by means of the bracket 33, it may be modified as shown in FIG. 7. The modified cover member 40 is integrally formed with an annular hook 41 which is engaged with the peripheral portion of through hole 12a of the panel 12 to anchor the cover member 40 in place.

In summary, the above embodiments are characterized in that both the push-pull cables 14a, 14b are resiliently clamped and supported by the respective cover members 20, 30 of elastic material which are fixedly coupled over the respective through holes 11a, 12a of wall panels 11, 12 to close the interior space between both the wall panels 11 and 12. This serves to prevent the vehicle compartment from unpleasant noises caused by engine noises resonating to the interior space between both the wall panels 11, 12 and also serves to reliably prevent noises due to vibration of the cables.

Although the present invention has been illustrated and described in connection with a specific embodiment, various adaptation and modifications will become apparent to those skilled in the art from the description in conjunction with the appended claims without departing from the scope and spirit of the present invention.

What is claimed is:

1. In a vehicle body structure wherein a reinforcement panel is arranged at an angle within a vehicle compartment and fixed at one end thereof to the upper portion of an upright fire-wall panel in the form of a rear wall of an engine room and at the other end thereof to a floor panel of the compartment for mounting a power transmission unit together with an internal combustion engine in said engine room, wherein said fire wall panel is between said engine room and said reinforcement panel and wherein each of said panels is provided with a through hole through which at least a push-pull cable of said transmission unit extends into the compartment to be connected to a manual shift lever, a support structure for said push-pull cable comprising:

a first cover member of elastic material coupled over said through hole of said fire-wall panel, and a second cover member of elastic material coupled over the through hole of said reinforcement panel and, together with said first cover member, closing an interior space between said panels, each of said first and second cover members being integrally formed at a substantially central portion thereof with a grommet through which said cable extends into the compartment from said transmission unit, wherein a first bracket is coupled over said first cover member and fixed to said fire-wall panel in such a way as to resiliently clamp said cable in place, and said second cover member is fixed at a peripheral portion thereof to said reinforcement panel by means which resiliently support said cable but do not clamp said cable, whereby noise and vibrations are not transmitted from said engine room to said vehicle compartment.

2. A support structure as claimed in claim 1, wherein a second bracket is coupled over a peripheral portion of said second cover member and fixed to said reinforcement panel to resiliently support said cable.

3. A support structure as claimed in claim 1, wherein each grommet of said first and second cover members is provided therein with a pair of parallel through holes through which a pair of push-pull cables extend into the vehicle compartment from said transmission unit, the inner diameter of each of said through holes being slightly smaller than the outer diameter of each of said cables, and each of said through holes being formed at its inner circumferential wall with female thread-like grooves.

* * * * *